INVENTOR.
WALLIS R. GRABOWSKY
BY
Philip Schneider
ATTORNEY

INVENTOR.
WALLIS R. GRABOWSKY
BY
Philip Schneider
ATTORNEY

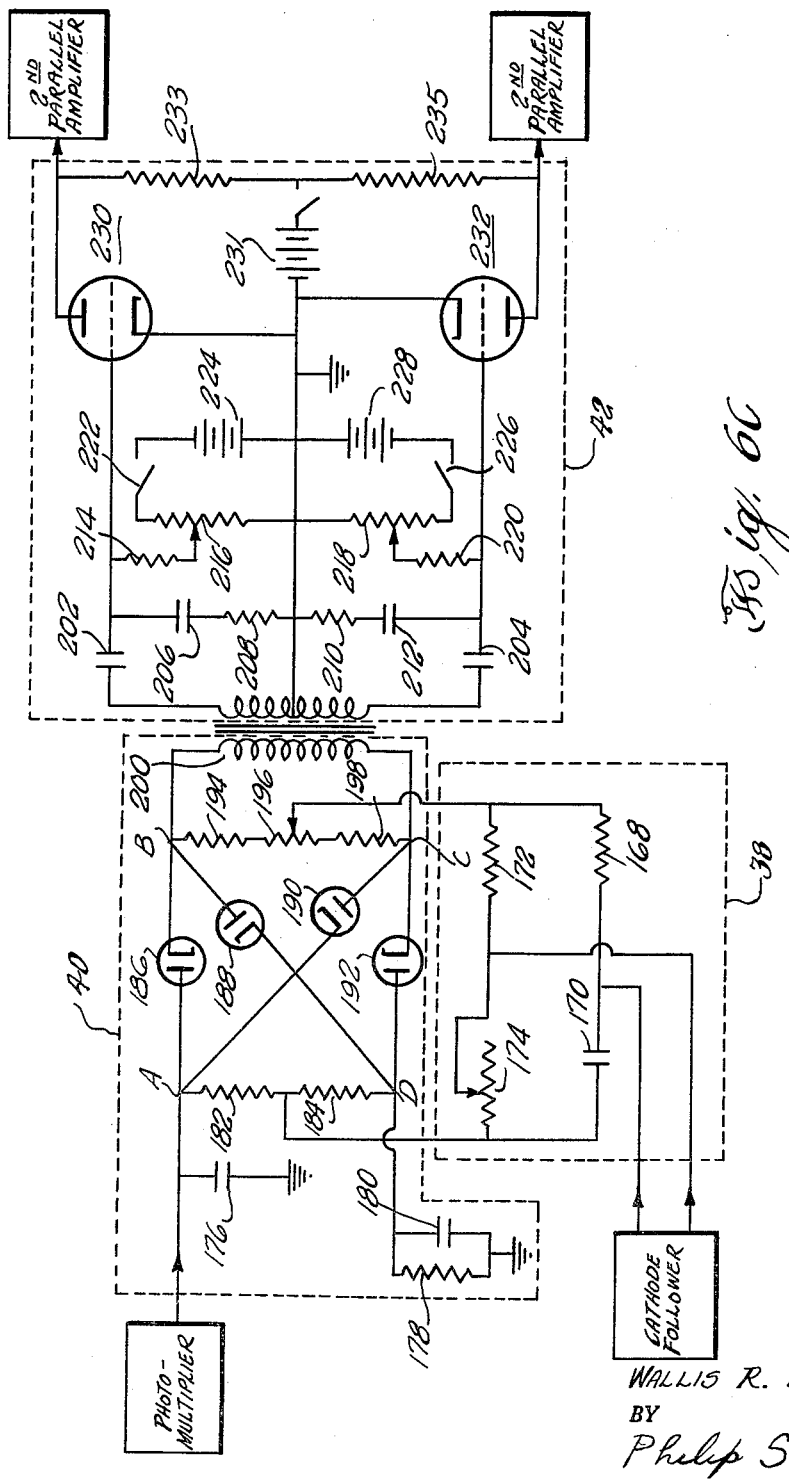

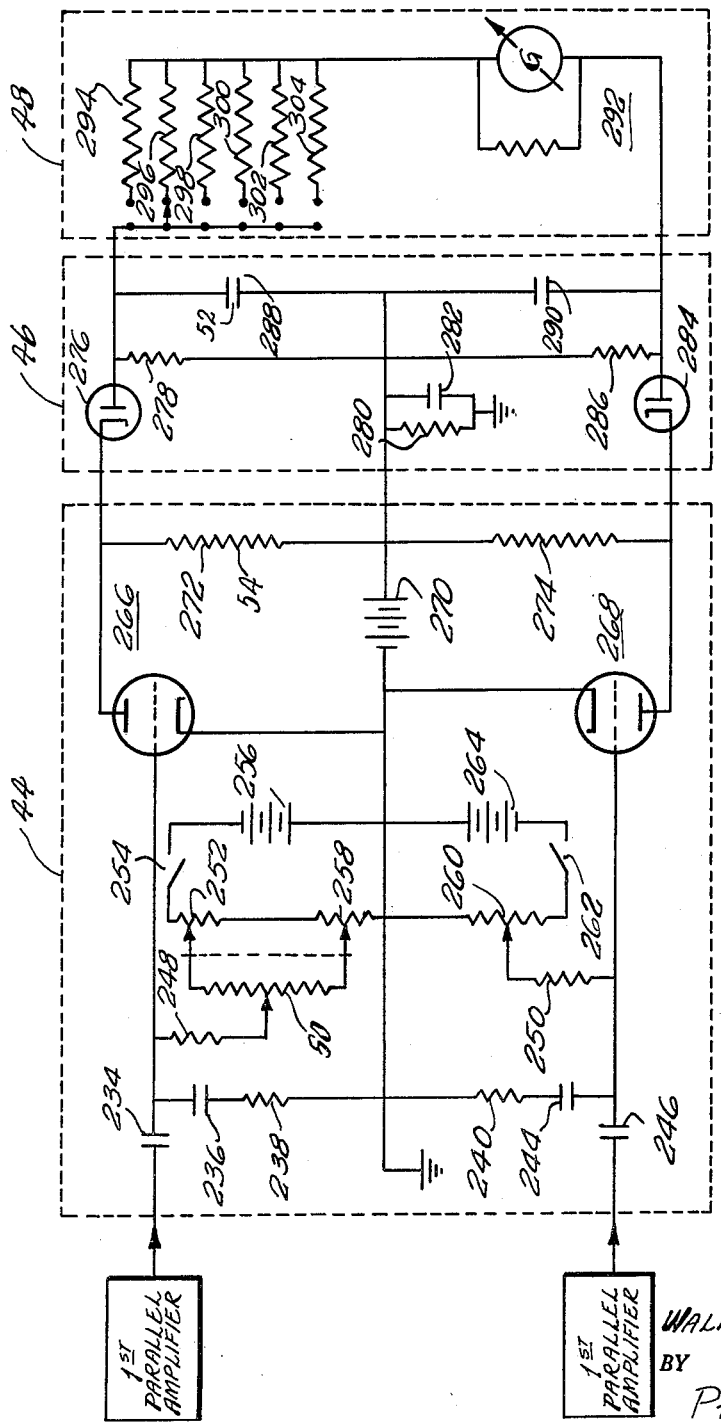

United States Patent Office 3,101,414
Patented Aug. 20, 1963

3,101,414
AERODYNAMIC DENSITY METER USING PHOTO-SENSITIVE SCHLIEREN OPTICAL SYSTEM
Wallis R. Grabowsky, San Pedro, Calif., assignor to the United States of America as represented by the Secretary of the Navy
Filed Sept. 28, 1961, Ser. No. 141,554
7 Claims. (Cl. 250—218)

This invention relates to an aerodynamic density meter and especially to a direct-reading instrument of high sensitivity which is particularly useful for measuring density changes associated with low-speed aerodynamic flows.

Heretofore, quantitative density measurements associated with aerodynamic flows have been made by means of shadowgraphs, schlieren or interferometers. These devices all require a photographic recording of results which makes it impossible to obtain immediate precise, quantitative information while a study is in progress. The shadowgraph is inherently a low-sensitivity device and is thus used exclusively for flow field visualization where density gradients are large, e.g., shock phenomena in high pressure flows. The schlieren system is in theory a highly sensitive device, but the high sensitivity is usually lost in photographic recording and interpretation. The interferometer is less sensitive than the schlieren, is very difficult to set up, and is quite expensive.

The need for extreme sensitivity becomes even more acute when density changes in low-speed aerodynamic flows are to be determined because density changes will be extremely small. This application describes an instrument capable of interpreting this density change as a proportional voltage difference. Such small voltage differences are easily measured.

Consider a signal voltage, $V+\Delta V$. If $V=5$ volts and $\Delta V=.000005$ volts, measurement of $V+\Delta V=5.000005$ volts is impossible (without a null system) since this requires a meter with at least 5 major divisions of 1 volt, each of these being subdivided into 100,000 subintervals. However, a way to obviate this difficulty is to use the method of difference measurement. Here a reference voltage, $V=5.000000$ volts is subtracted from the signal voltage, $V+\Delta V=5.000005$ volts, to obtain the difference, $\Delta V=.000005$ volts. This permits the use of a meter which reads .00001 volts full scale and reading $\Delta V$ becomes easy.

The objects and advantages of the present invention are accomplished by means of a split-beam schlieren system in combination with an electronics system which converts the two light beams into corresponding pulsating D.C., signal voltages, transforms the pulsating D.C. signals into A.C. signals, rectifies these A.C. signals and eliminates most of the noise associated with the signal voltages, changes the rectified A.C. signals into corresponding steady D.C. voltages and subtracts the D.C. voltages to obtain their difference.

The object of the invention is to provide a schlieren-type instrument for studying aerodynamic flow, said instrument having high sensitivity, being capable of measuring the density changes of steady and unsteady flows, having quick readout for steady flow applications, being applicable to density measurements of flow speeds ranging from slow to hypersonic, and being fairly inexpensive to construct.

Other objects and many of the attendant advantages of this invention will be readily appreciated as the same becomes better understood by reference to the following detailed description when considered in connection with the accompanying drawings wherein:

FIGS. 6A through 6D are schematic circuit diagrams of the electronic portions of the embodiment of the invention shown in FIG. 1.

Figure 1:
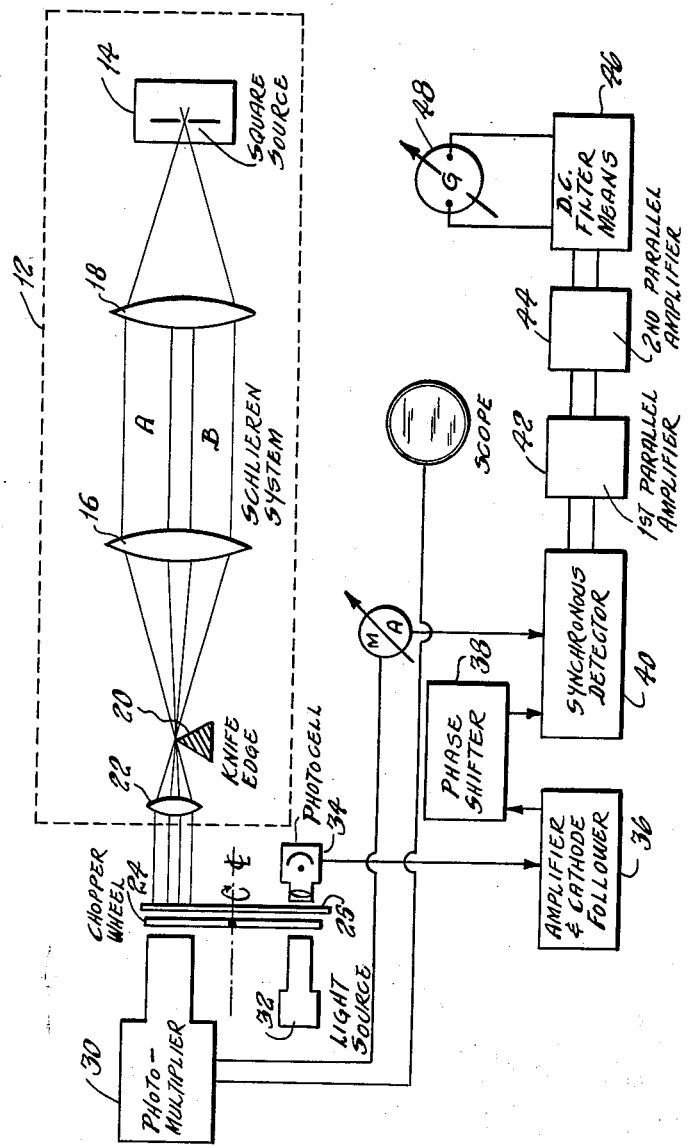
FIG. 1 is a diagrammatic illustration, partly in block form, of an embodiment of the invention.

The basic concept of the invention is illustrated in the schematic diagram, FIG. 1. Here a standard schlieren system 12, comprising a light source 14 providing a one millimeter square image, a pair of $f2.5$ lenses 16 and 18, a knife edge 20 and a collimating lens 22, projects a collimated beam of light through windows in a stationary chopper-wheel cover plate 25 upon a rotating chopper wheel 24.

Figure 2:
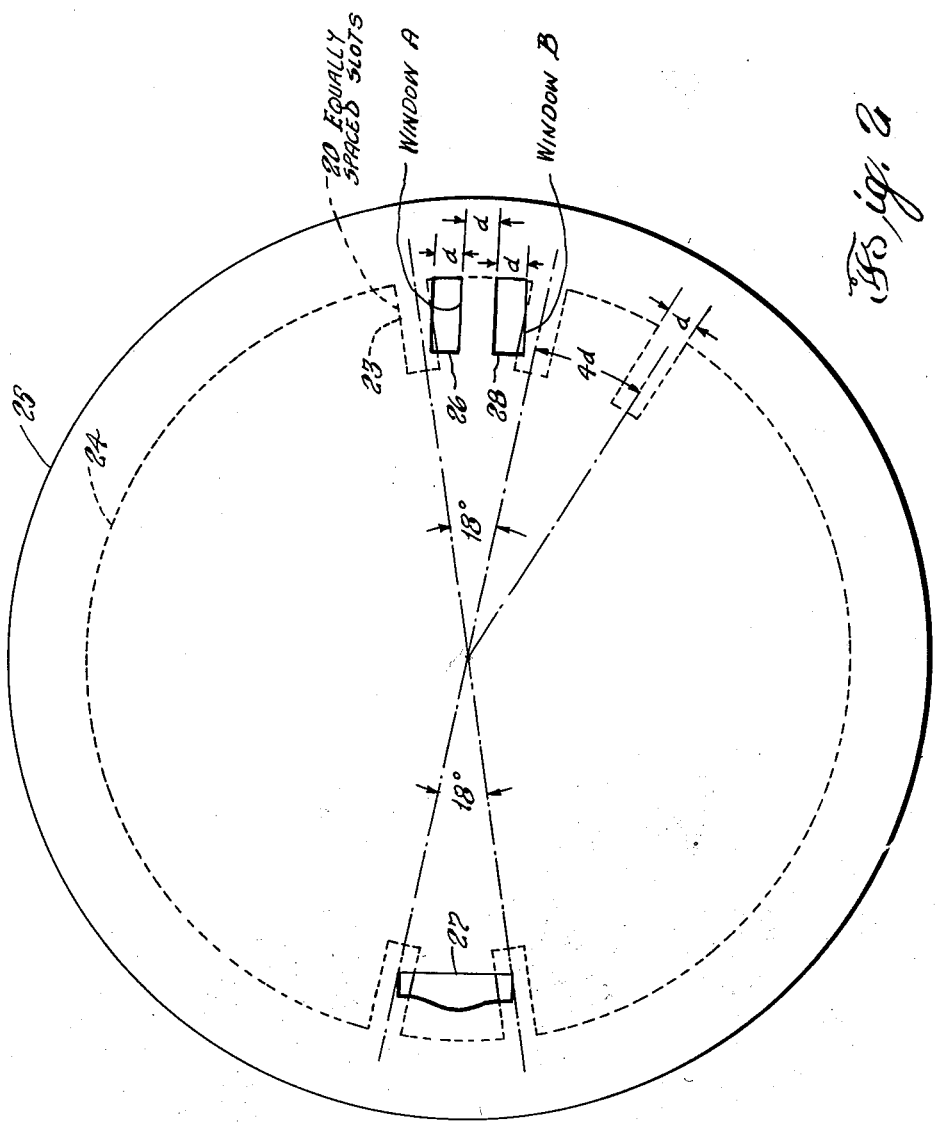
FIG. 2 is a diagrammatic representation of the chopper wheel and the chopper-wheel cover plate, the chopper wheel being behind the cover plate, and only sufficient slots being shown to illustrate the geometrical relationships between the slots and the windows.
Figure 3:
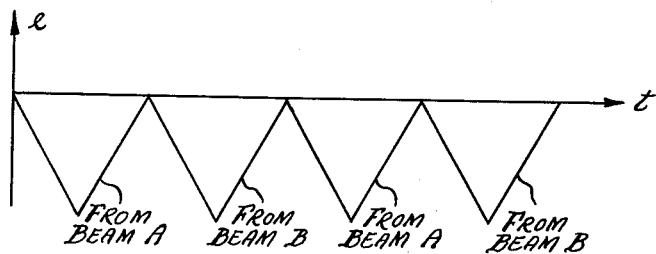
FIG. 3 is a representation of the photomultiplier output wave form.

The chopper wheel 24 indicated in FIG. 2 has twenty slots 23 spaced 18 degrees apart, the distance between the slot centerlines at center radius being four slot widths $(4d)$. The chopper-wheel cover plate 25 has two rectangular openings or windows 26 and 28, the centerlines at the windows being separated by 9 degrees. The width $(d)$ of each of the rectangular windows 26 and 28 is the same as the width $(d)$ of a slot 23. These windows effectively divide the light beam into two halves, A and B, which impinge upon the photomultiplier 30, and are alternately interrupted by the action of the rotating chopper wheel. The photomultiplier output signal is ideally indicated in FIG. 3 and may be seen to be a pulsating D.C. signal with a repetition rate (or, as it will be termed hereinafter "frequency") of about 1200 c.p.s.

Figure 4:
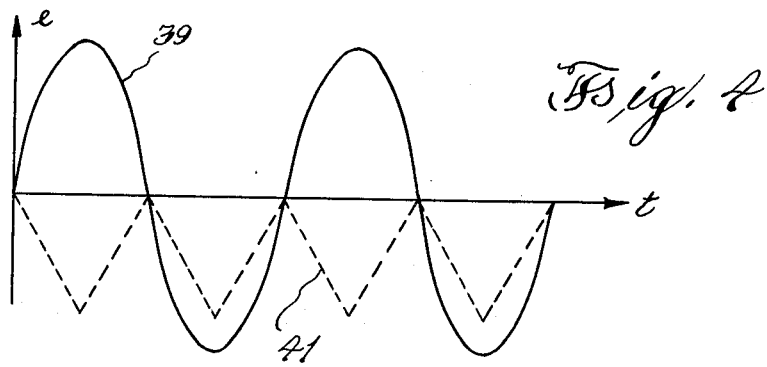
FIG. 4 is a representation illustrating the relationship between the photomultiplier output signal and the switching signal.

The chopper wheel cover plate 25 also has a third opening 27 which is sinusoidally shaped on one of its circumferential sides and aligned with the chopper wheel slots 26 and 28. Light from light source 32 passes through this opening and falls upon a photocell 34 which provides a sine wave output signal. The size and spacing of this opening 27 produces a sine wave of frequency equal to the frequency of the output pulses of either light beam, A or B, or half the frequency of the output signal of the photomultiplier 30. The sine wave signal is fed through an amplifier and cathode follower stage 36 and a phase shifter 38, so that the zero voltage points of the sine wave and the photomultiplier output signal can be made to coincide. The phase relationship of the two waves is shown in FIG. 4, where the phase-shifted sine wave is indicated by numeral 39 and the photomultiplier output signal by numeral 41.

Figure 5:
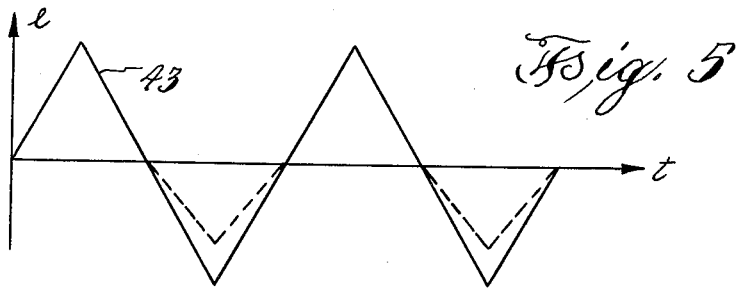
FIG. 5 is a representation of the output signal of the synchronous detector.

The output signal of the photomultiplier 30 and the phase-shifted sine wave signal are applied to a synchronous detector 40. The sine wave signal derived from the photocell 34 will hereinafter be referred to as the switching signal. The synchronous detector 40 is an electronic switch, the switching action of which is effected by the switching signal. The synchronous detector 40 changes the pulsating D.C. signal from the photomultiplier 30 to an A.C. signal 43, which has a zero D.C. level if the signals from beam A and beam B are equal. If the medium through which one beam travels is different in density gradient from the medium through which the other beam travels, the output from one beam will differ in amplitude from the output of the other beam. A density change in either beam causes an average current to flow from the detector. The normal A.C. signal (i.e., the A.C. signal which results when the outputs of the two beams are equal) that appears at the output of the synchronous detector 40 is shown by the solid line curve in FIG. 5. The dotted line shows how this half of the signal would appear if the outputs of the two beams were unequal, the signal from beam B being smaller than that from beam A. The negative pulses are derived from one beam and the positive pulses from the other. The chopper wheel reduces the total signal strength by a factor of one half, but produces a frequency which allows amplification and noise reduction.

The output signal from the synchronous detector 40 is fed to a pair of paralleled amplifiers 42, the input to the amplifier tubes being made through a transformer. Thus, the positive part of the input signal to one amplifier tube is the signal from one of the schlieren system light beams, and the positive part of the input signal to the other amplifier tube is the signal from the other of the schlieren system light beams. The amplified output is then fed to a second pair of paralleled amplifiers 44, which amplifies the waves and clips off the positive parts of each wave, resulting in a pair of outputs that resemble half-wave rectified signals, one wave being derived from one light beam and the other wave being derived from the other light beam.

Each rectified wave is applied to a separate diode circuit and filter, collectively labelled rectifier and filter means 46 in FIG. 1, which changes the half-wave rectified signals into steady D.C. signals. The diodes act as switches which prevent discharge of the filter condensers 52 through the plate load resistors 54 of the second pair of parallel amplifiers 44. The difference in the D.C. levels is then displayed on a galvanometer 48.

Figure 6A:
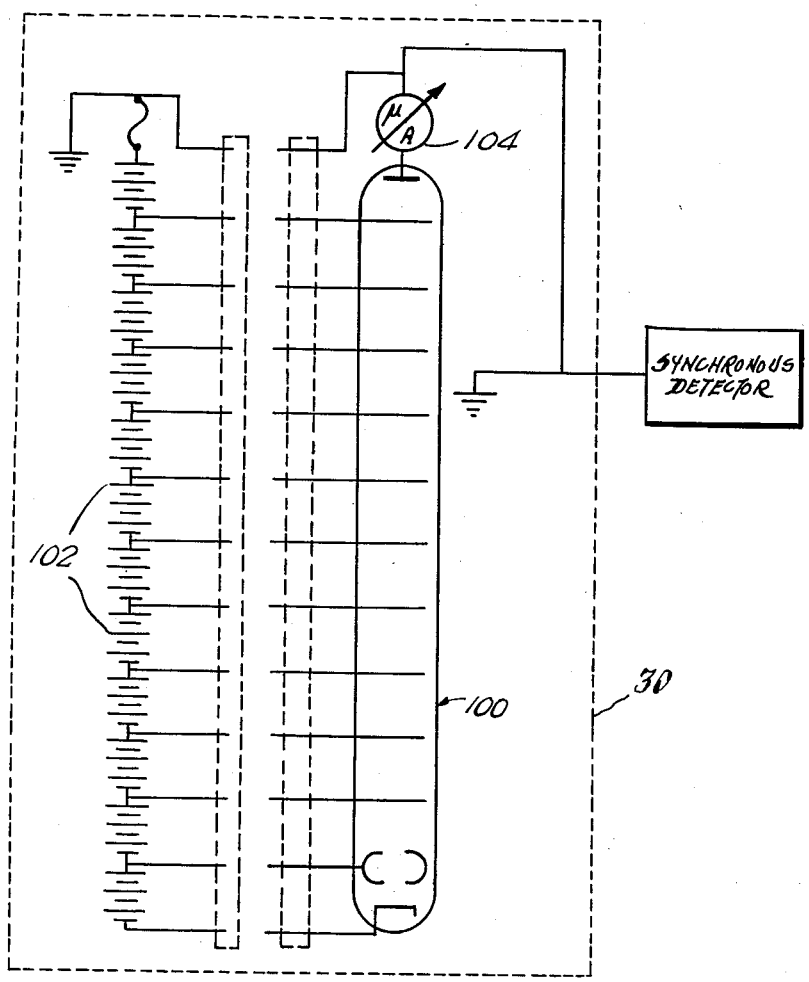

The schematic diagram for the electronic circuits is shown in FIGS. 6A through 6D. The circuits are conventional and a detailed description is therefore unnecessary. FIG. 6a shows the photomultiplier 30 comprising a photomultiplier tube 100 with a power supply for its various electrodes, the power supply consisting of a number of batteries 102 connected in series. The output current of the photomultiplier tube is fed through a microammeter 104 to the synchronous detector 40.

Figure 6B:
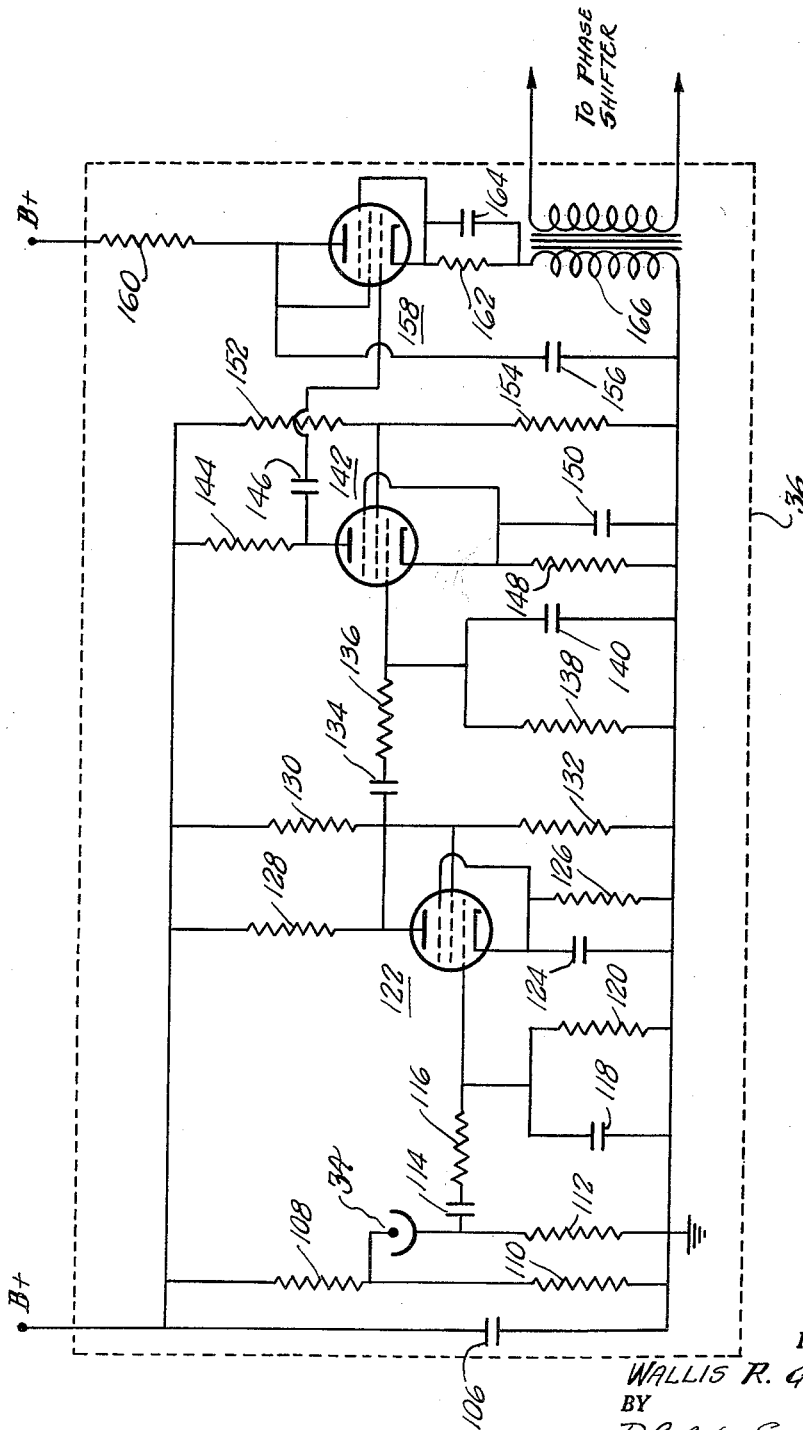

The output current of the photocell 34 is passed through a resistor 112, as shown in FIG. 6B, and the voltage thus developed is amplified by two resistance-capacity amplifiers 122 and 142. The output of the amplifiers is then applied to a cathode-follower stage 158. A signal is derived from a transformer 166 which is in series with the cathode of the cathode follower 158 and passed through a phase shifter 38.

The phase shifter 38 (see FIG. 6C) is a bridge network having one branch comprising a resistor 168 and a capacitor 170 in series and a second paralleled branch comprising a resistor 172 and a rheostat 174 in series.

The phase shifter output is fed to the synchronous detector 40 the structure of which can be described in terms of a square having four corners A, B, C and D. A pair of resistors 182 and 184 are connected in series between corners A and D. A diode is connected between corners A and B with its anode at corner D. A second diode is connected between corners D and C with its anode at corner D. A third diode is connected diagonally between corners D and B with its anode at corner B and a fourth diode is connected between corners A and C with its anode at corner C. A series resistive network comprising a resistor 194, a potentiometer 196 and another resistor 198 is connected between corners B and C. One of the phase shifter output leads is connected between resistors 182 and 184 and the other output lead is connected to the moving arm of the potentiometer 196. The output of the photomultiplier 30 is applied between corner A and ground. The output of the synchronous detector 40 is derived by means of a transformer 200 the input winding of which is connected across corners B and C.

The output winding of transformer 200 feeds a pair of parallel triode amplifier stages 230 and 232 which comprise what is designated as the first parallel amplifier 42 in FIG. 1. Each of these triode amplifiers feeds a different one of a second set of parallel triode amplifiers 266 and 268. These amplifiers 266 and 268 are operated class C and each clips off the negative portion of the signal which is applied to it. The small load resistor 272 and 274 (3.6K) used in these stages permits a large amount of power to be drawn and also permits the fast charging of capacitors 288 and 290. To prevent discharge of these capacitors through the low value of load resistance, diodes 276 and 284 are inserted in the circuit. The diodes maintain the voltage level on the capacitors 288 and 290.

A helipot 50 is connected in the grid bias circuit of the triode of one of the second parallel amplifier stages (266). It is used for precise adjustment of the grid bias voltage so that the outputs of the second parallel amplifier 44 can be equalized prior to the taking of any measurements.

The output of the capacitors 288 and 290, which is the algebraic sum of the voltages appearing across them, is applied across a galvanometer 48, comprising the instrument itself 292 and a set of multiplying resistors 294—304.

In such a high sensitivity instrument, noise presents a serious problem. A high signal-to-noise ratio is obtained by designing the paralleled amplifiers for a narrow band width, in this case about 900 c.p.s., the second harmonic of the 600 c.p.s. signal input being completely attenuated. Thus, high frequency noise is eliminated.

Noise in the lower part of the spectrum on the order of 60 c.p.s. or less, which enters the system prior to the synchronous detector, causes little difficulty because of the design of the system. Noise in this part of the spectrum appears at the output of the synchro detector as amplitude modulation on the 600 c.p.s. signal. It therefore produces the same D.C. signal on both sides of the galvanometer and effectively cancels itself out.

Thus, only a small bandwidth of the noise spectrum interferes with the output signal.

The range over which this instrument is useful covers speed flows from about eight feet per second to about Mach 8 (radiation cut-off).

Certain precautions should be taken to insure that the inherent high sensitivity of the instrument is not lessened by extraneous factors. Random temperature differences existing in the light beam path will produce galvanometer fluctuations. Thermal shielding of the light beam should be employed.

All parts of the schlieren system must be isolated from vibrations produced by the chopper wheel. It is advisable to use a journal-type bearing of considerable length rather than a ball or roller bearing for the chopper wheel axle, due to the noise associated with the latter types. If the foundation for the schlieren system is subject to external vibration, then it should be shock mounted, which is highly desirable in any case.

The photomultiplier should be magnetically shielded as its output is influenced rather markedly by local magnetic fields. Vibration of the tube itself, say from chopper wheel rotation, does not appear to cause any difficulty.

The detectors, amplifiers and galvanometer should be shock mounted and electrically shielded. Acoustic shielding of all components is desirable. The components of the detectors and paralleled amplifiers should be matched, of course.

A typical set of values for the components shown in FIGS. 6A–D is given below (capacitors in mfd. and resistors in kilohms unless otherwise noted):

| | | | |
|---|---|---|---|
| 100 | Dumont 6292 | 116 | 500 |
| 106 | 0.6 | 118 mmf | 80 |
| 108 | 170 | 120 | 10M |
| 110 | 150 | 122 | 6SJ7 |
| 112 | 130 | 124 | 1 |
| 114 mmf | 200 | 126 | 0.6 |

| | | | |
|---|---|---|---|
| 128 | 33 | 218 | 5 |
| 130 | 7.5M | 220 | 100 |
| 132 | 10M | 224 _____V__ | 4.5 |
| 134 _____mmf__ | 500 | 228 _____V__ | 4.5 |
| 136 | 500 | 230 | 6J4 |
| 138 | 5M | 231 _____V__ | 180 |
| 140 _____mmf__ | 160 | 232 | 6J4 |
| 142 | 6SJ7 | 233 | 20 |
| 144 | 33 | 234 | 0.1 |
| 146 _____mmf__ | 500 | 235 | 20 |
| 148 | 0.6 | 236 | 0.01 |
| 150 | 20 | 238 | 1 |
| 152 | 7.5M | 240 | 1 |
| 154 | 10M | 244 | 0.01 |
| 156 | 1 | 246 | 0.1 |
| 158 | 6L6 | 248 | 170 |
| 160 | 0.33 | 250 | 170 |
| 162 | .5 | 50 | 1 |
| 164 | 20 | 252 | 10 |
| 168 | 100 | 256 _____V__ | 22 |
| 170 | 0.1 | 258 | 10 |
| 172 | 100 | 260 | 10 |
| 174 | 10 | 264 _____V__ | 22 |
| 176 | .009 | 266 | 6J4 |
| 178 | 10 | 268 | 6J4 |
| 180 | 0.01 | 270 _____V__ | 180 |
| 182 | 10 | 272 | 3.6 |
| 184 | 10 | 274 | 3.6 |
| 186 | 6H6 | 276 | ½-6H6 |
| 188 | 6H6 | 278 | 300 |
| 190 | 6H6 | 280 | 300 |
| 192 | 6H6 | 282 _____mmf__ | 200 |
| 194 | 10 | 284 | ½-6H6 |
| 196 | 10 | 286 | 300 |
| 198 | 10 | 288 | 40 |
| 202 | 0.1 | 290 | 40 |
| 204 | 0.1 | 292 | 0.8 |
| 206 | .004 | 294 | 0.5 |
| 208 | 1 | 296 | 1 |
| 210 | 1 | 298 | 10 |
| 212 | .004 | 300 | 100 |
| 214 | 100 | 302 | 1000 |
| 216 | 5 | 304 | 10000 |

Obviously many modifications and variations of the present invention are possible in the light of the above teachings. It is therefore to be understood that within the scope of the appended claims the invention may be practiced otherwise than as specifically described.

I claim:

1. An instrument for the measurement of density difeernces in a medium exposed to an aerodynamic flow comprising, in combination: schlieren optical means for projecting a collimated beam of light through said medium; means for dividing said light beam into two parts and for interrupting each part alternately; means for producing an electrical output signal proportional to light intensity, said light beam being directed at said signal-producing means to provide an electrical output comprising a pulsating D.C. signal every second pulse of which is proportional to the intensity of the same part of said light beam, alternate pulses being derived from different parts of said light beam; means for obtaining an A.C. signal having a characteristic proportional to a characteristic of said pulsating D.C. signal; narrow-bandwidth means for passing said A.C. signal and eliminating frequencies other than a narrow band including said A.C. signal, thereby eliminating the spectrum of noise signals outside said narrow band; means for separating said A.C. signal into individual components, each corresponding to the output associated with a different one of the parts of said light beam, said components comprising steady D.C. signals; and means for obtaining and indicating the difference between said steady D.C. signals.

2. An instrument for the measurement of density differences in a medium exposed to an aerodynamic flow comprising, in combination: schlieren optical means for projecting a collimated beam of light through said medium; means for dividing said light beam into two halves and for interrupting each half alternately; means for producing an electrical output signal proportional to light intensity, said light beam being directed at said signal-producing means to provide an electrical output comprising a pulsating D.C. signal every second pulse of which is proportional to the intensity of the same half of said light beam, alternate pulses being derived from different halves of said light beam; means for obtaining an A.C. signal having a frequency proportional to that of said pulsating D.C. signal; narrow bandwidth means for passing said A.C. signal and eliminating frequencies other than a narrow band including said A.C. signal, thereby eliminating the spectrum of noise signals outside said narrow band; means for separating said A.C. signal into individual components, each corresponding to the output associated with a different one of the halves of said light beam, said components comprising steady D.C. signals; and means for obtaining and indicating the difference between said steady D.C. signals.

3. An instrument for the measurement of density differences in a medium exposed to an aerodynamic flow comprising, in combination: a schlieren optical system including a light beam traversing said medium; means for dividing said light beam into two parts and for interrupting each part alternately; first means for producing an electrical output signal proportional to light intensity, said light beam being directed at said first means to provide an electrical output comprising a pulsating D.C. signal every second pulse of which is proportional to the intensity of the same part of said light beam; alternate pulses being derived from different parts of said light beam; second means for obtaining an electrical output signal, said second signal being an A.C. signal having a frequency equal to the repetition rate of the electrical pulses derived from either of said parts of said light beam; means for phasing one of said electrical output signals so that selected points of the waves are caused to coincide; means for transforming said two phased electrical output signals into a single A.C. signal having a characteristic proportional to a characteristic of said pulsating D.C. signal from said first means; means, to which said A.C. signal is applied, for passing only a narrow band of frequencies which includes that of said A.C. signal, noise outside of said band of frequencies thereby being eliminated; means for producing a pair of rectified signals from said narrow-band A.C. signal, the first rectified signal corresponding to the output signal from one part of said light beam and the other rectified signal corresponding to the output signal from the other part of said light beam; means for deriving a steady D.C. signal from each of said rectified A.C. signals; and means for obtaining and indicating the difference between said steady D.C. signals.

4. An instrument for the measurement of density differences in a medium exposed to an aerodynamic flow comprising, in combination: a schlieren optical system including a light beam traversing said medium; means for dividing said light beam into two halves and for interrupting each half alternately; first means for producing an electrical output signal proportional to light intensity, said light beam being directed at said first means to provide an electrical output comprising a pulsating D.C. signal every second pulse of which is proportional to the intensity of the same half of said light beam, alternate pulses being derived from different halves of said light beam; second means for producing an electrical output signal, said second signal being an A.C. signal having a frequency equal to the repetition rate of the electrical pulses derived from either of said halves of said light beam; means for phasing one of said electrical output signals to that selected points of waves are caused to coincide; means for transforming said two phased electrical output signals into a single A.C. signal having a characteristic proportional to a characteristic of said pulsating D.C. signal from said first means; means, to which said A.C. signal is applied, for passing only a narrow band of frequencies which includes that of said A.C. signal, noise outside of said band of frequencies thereby being eliminated; means for producing a pair of rectified signals from said narrow-band A.C. signal, the first rectified signal corresponding to the output signal from one half of said light beam and the other rectified signal corresponding to the output signal from the other half of said light beam; means for deriving a steady D.C. signal from each of said rectified A.C. signals; and means for obtaining and indicating the difference between said steady D.C. signals.

5. An instrument for the measurement of density differences in a medium exposed to an aerodynamic flow comprising, in combination: a schlieren optical system including a light beam traversing said medium; means for dividing said light beam into two halves and for interrupting each half alternately; first means for producing an electrical output signal proportional to light intensity, said light beam being directed at said first means to provide an electrical output comprising a pulsating D.C. signal every second pulse of which is proportional to the intensity of the same half of said light beam, alternate pulses being derived from different halves of said light beam; means for producing an electrical output signal, said second signal being an A.C. signal having a frequency equal to the repetition rate of the electrical pulses derived from either of said halves of said light beam; means for shifting the phase of said A.C. signal so that the zero voltage points of the A.C. and pulsating D.C. signals coincide; means for transforming said two phased electrical output signals into a single A.C. signal having a characteristic proportional to a characteristic of said pulsating D.C. signal from said first means; means, to which said A.C. signal is applied, for passing only a narrow band of frequencies which includes that of said A.C. signal, noise outside of said band of frequencies thereby being eliminated; means for producing a pair of rectified signals from said narrow-band A.C. signal, the first rectified signal corresponding to the output signal from one half of said light beam and the other rectified signal corresponding to the output signal from the other half of said light beam; means for deriving a steady D.C. signal from each of said rectified A.C. signals; and means for obtaining and indicating the difference between said steady D.C. signals.

6. An instrument for the measurement of density difference in a medium exposed to an aerodynamic flow comprising, in combination: a schlieren optical system including a light beam traversing said medium; means for dividing said light beam into two halves and for interrupting each half alternately; first means for producing an electrical output signal proportional to light intensity, said light beam being directed at said first means to provide an electrical output comprising a pulsating D.C. signal every second pulse of which is proportional to the intensity of the same half of said light beam, alternate pulses being derived from different halves of said light beam; means for producing an electrical output signal, said second signal being an A.C. signal having a frequency equal to the repetition rate of the electrical pulses derived from either of said halves of said light beam; means for shifting the phase of said A.C. signal so that the zero voltage points of the A.C. and pulsating D.C. signals coincide; means for transforming said two phased electrical output signals into a single A.C. signal having its positive crest amplitude proportional to the amplitude of the signals from one half of said light beam and its negative crest amplitude proportional to the amplitude of the signals from the other half of said light beam; means, to which said A.C. signal is applied, for passing only a narrow band of frequencies which includes that of said A.C. signal, noise outside of said band of frequencies thereby being eliminated; means for producing a pair of rectified signals from said narrow-band A.C. signal, the first rectified signal corresponding to the output signal from one half of said light beam and the other rectified signal corresponding to the output signal from the other half of said light beam; means for deriving a steady D.C. signal from each of said rectified A.C. signals; and means for obtaining and indicating the difference between said steady D.C. signals.

7. An instrument for the measurement of density differences in a medium exposed to an aerodynamic flow comprising, in combination: a schlieren optical system including a light beam traversing said medium; a rotatable, opaque chopper wheel having a set of equally spaced, substantially rectangular, peripheral slots, the width of each slot at its center being equal to a dimension ($d$) and the distance between the slots at their centers being equal to ($4d$); a stationary opaque plate concentric with and shielding said chopper wheel from said light beam, said plate having a pair of substantially rectangular windows located approximately in axial correspondence with said chopper slots, the width of said windows being equal to the width ($d$) of said slots and the adjacent edges of said windows being spaced from each other by an amount ($d$), said plate also having a third substantially rectangular window with one substantially sinusoidally shaped side extending in the same direction as the circumference of said chopper wheel, the long dimension of said third window extending in the circumferential dimension of said chopper wheel from the center of one said slot to the center of an adjacent slot; a photomultiplier having a light-responsive element, said chopper wheel and said opaque plate being located between said light beam and said light-responsive element, said light beam being allowed to impinge upon said chopper-wheel slots by said first and second windows; photocell means and a light source, said chopper wheel being located therebetween, light from said light source being allowed to impinge upon the photocell by said sinusoidal window; phase-shifting means connected to said photocell means for shifting the phase of the photocell output signal; synchronous detector means connected to receive the phase-shifted signal and the photomultiplier output signal as inputs and to provide an A.C. signal output therefrom, the positive portion being proportional to the signals from one of said first two windows and the negative portion being proportional to the signals from the other; narrow-band amplifier means for splitting said A.C. signal into two parts and amplifying each part separately, the first part having its positive portion corresponding to the positive portion of said A.C. signal, and the second part having its positive portion corresponding to the negative portion of said A.C. signal, the bandwidth of the amplifier means allowing passage of the A.C. signal frequency but cutting out most of the noise spectrum because of its narrowness; rectifier and filter means for rectifying each of said amplified A.C. signals individually to obtain rectified waves consisting of the positive portion thereof and for obtaining a steady D.C. signal from each of said rectified waves; and galvanometer means to which said steady D.C. signals are applied for indicating the difference in amplitude between them.

References Cited in the file of this patent
UNITED STATES PATENTS

| | | |
|---|---|---|
| 2,547,212 | Jamison et al. | Apr. 3, 1951 |
| 2,864,278 | Sparks | Dec. 16, 1958 |